2,565,161

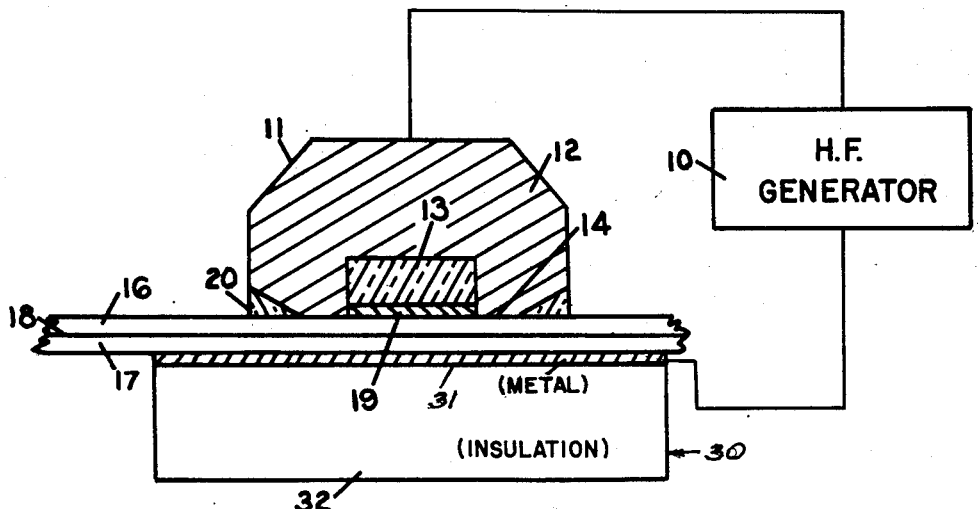
FIG. I
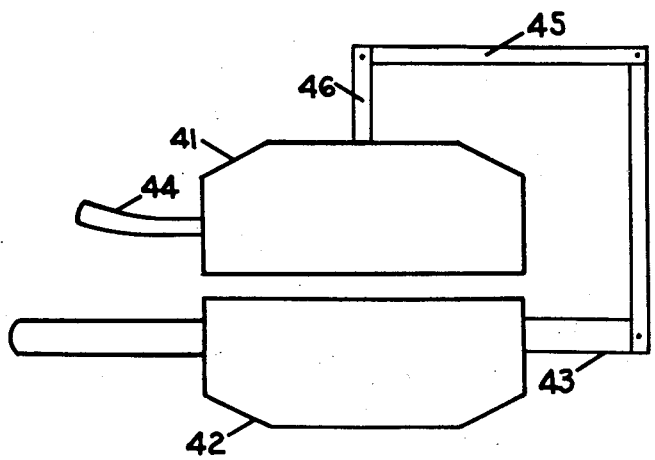
FIG. II
INVENTORS
Raymond M. Wilmotte
Hugh J. Cameron
Larry L. Young Patented Aug. 21, 1951

UNITED STATES PATENT OFFICE 2,565,161

HIGH-FREQUENCY DIELECTRIC HEATING

Raymond M. Wilmotte, Washington, D. C., and Hugh J. Cameron, New Rochelle, and Larry L. Young, New York, N. Y.; said Cameron and said Young assignors to said Wilmotte Application October 6, 1945, Serial No. 620,772

6 Claims. (Cl. 219—47)

1

This invention relates to the welding of thin sheets of thermoplastic material.

While commercially acceptable welds have been produced between thin sheets of certain thermoplastics such as "Vinylite," it has been either not possible to produce any welds at all, or only very faulty welds between thin sheets which do not plasticize so readily as "Vinylite," or which have low breakdown potentials or low power factors. For example, C. N. Hoyler, Electronics, August 1943, page 90 states that "Koroseal" .001 inch thick would not weld, and that the welding of "Saran" sheets less than .005 inch thick was erratic, though frequencies up to 60 megacycles were employed. Cellulose acetate is even more difficult to weld. When welds have been achieved in such materials, they have been only partially complete and weak, and entirely unsatisfactory because of holes due to melting of the sheets, charring round the perimeter of the electrodes, severe warping and other deformations. Because of these difficulties, high frequency dielectric heating has proved useless for the welding of such materials.

After extensive experimental and mathematical study, we have determined the causes of the above mentioned faults and failures, and have discovered that it is possible to construct electrodes which unerringly produce faultless welds between extremely thin sheets with efficiently usable frequencies and powers. The electrodes are constructed so that, at the expense of a small amount of heat from the plastic sheets, their working face rapidly acquires a substantial part of the temperature rise necessary for producing the weld, while at the same time avoiding tackiness and sticking to the electrode, and providing rapid cooling after the power is shut off. The electrodes are also constructed so as to effectively form a mold which holds the sheets against deformation and to eliminate charring. The principles and the actual construction of this electrode will be fully explained hereinafter.

It is an object of our invention to extend the usefulness of high frequency dielectric heating to materials having a thickness of the order of .001 inch and low power factors or breakdown potentials.

It is another object of our invention to produce faultless welds between extremely thin thermoplastic sheets by high frequency dielectric heating.

It is a further object of our invention to produce welds between thin thermoplastic sheets without deforming the said sheets.

2

It is another object of our invention to weld thermoplastic sheets together without charring the same.

It is a further object of our invention to weld thermoplastic sheets together utilizing relatively low radio frequency power of efficiently usable frequencies.

In dielectric welding the heat is developed in the material itself by high frequency electric fields. The temperature rise is determined by the rate at which heat can be developed in the plastic material and the rate at which the developed heat is conducted away from the plastic material. The controllable parameters determining the rate at which heat can be developed are the intensity and frequency of the electric field. The intensity is limited by the breakdown potential of the plastic material, which potential is quite low for very thin sheets. The efficiently usable frequency is limited in practice by the capacty of the electrodes and other factors. When a sizeable area of very thin plastic sheets is to be welded, the capacity between the electrodes is large and the breakdown, or puncturing voltage is quite low, so that both the intensity and the frequency of the electric field are severely restricted. The rate at which heat can be developed is, therefore, very limited.

The limitation on the rate at which heat can be developed in thin thermoplastic sheets is tantamount to a limitation on the temperature differential which can be established across the thickness of such sheets. In order to cause a pair of sheets to be welded together, it is necessary to raise the temperature at their interfacial surfaces approximately to the fusing point. We have solved the problem of attaining this temperature at the interfacial surfaces, in the presence of all the existing limitations, by causing the effective electric field to be produced by a very thin film having a limited amount of thermal conduction to the body of the electrode and a very small thermal capacity.

The invention will be fully understood by reference to the following description and drawing in which:

Figure 1 is a schematic view of our apparatus showing one of the electrodes in cross section, and Figure 2 shows a press embodying the electrodes of our invention.

Referring to the figures of the drawing, there is illustrated a high frequency generator 10 connected to a pair of electrodes 11 and 30. Electrodes 11 and 30 may be the two plates of a press, and in a manner well known in the art will be applied to the plastic sheets with some pressure. Generator 10 may operate at any high frequency such as 10 to 100 megacycles, depending on the plastic material and other factors. The thermoplastic sheets 16 and 17 may have a thickness of the order of .001 of an inch or greater, and may be placed between the electrodes 11 and 30 under pressure substantially shown as Figure 1.

The electrode 11 consists of a metallic body 12 having a centrally located insert 13. The insert 13 is formed of a material having low thermal conductivity and has sufficient thickness to effectively thermally insulate the central portion of a metallic film 19 from the metallic body 12 of the electrode. A peripheral metallic portion 14 surrounds the insert 13 and is in electrical contact with the metallic film 19. A guard ring 20, having a very high dielectric constant, surrounds the peripheral metallic portion 14 and forms the periphery of the working face of the electrode 11. The metallic film 19 may have a thickness of .001 inch or less, and may be made of copper or any other material of high electrical conductivity. In the drawnig the thickness of the film 19 and other parts having very small dimensions are exaggerated for the sake of clearness of illustration. The working face of electrode 11 may be circular, or rectangular, or have any other suitable shape.

The bottom electrode 30 is preferably made in the form of a plate, and may constitute the fixed plate of the press. The electrode 30 consists of a metallic film 31 and a backing of insulated material 32. The metallic film 31 has substantially the same thickness as metallic film 19.

Figure 2 schematically shows a press utilizing a pair of electrodes 41 and 42 constructed in accordance with our invention. Either or both of the electrodes may be similar to electrode 11 in Figure 1. The bottom electrode 42 is mounted in a large plate 43 which forms the fixed plate of the press. The electrode 41 is provided with a handle 44 used for closing the press. It is obvious that the press could be closed by any other well known means such as a foot lever or spring mechanism. The electrode 41 may be carried by pivoted arms 45 and 46, or supported in any other manner.

The operation of the apparatus of our invention is as follows: The plastic sheets to be welded are placed on the lower electrode and the upper electrode is then brought into contact with the sheets, so that the area of sheets to be welded lies under the insert 13 of electrode 11. The generator 10 is then turned on for a time of the order of 100 milseconds. The heat developed in the plastic sheets adjacent to metallic portion 14 is rapidly conducted away, so that the portions of the metallic sheets adjacent to portion 14 remain cold and hard. The surfaces of the electrodes in contact with the plastic sheets are smooth and tightly fitting against the plastic sheets so that the electrodes, together with the hard portions of the plastic sheets adjacent to the portion 14, form a die or mold which maintains the original shape of the plastic sheets during the welding operation. This die or mold formed by the electrodes together with the portion of the plastic sheets surrounding the weld is very important since it eliminates the possibility of deformation during the welding operation. A portion of the heat generated in the plastic sheets over the area to be welded is conducted to the films 19 and 31 of the electrodes. Since these films have a very low thermal capacity, only a very small amount of heat is required to raise their temperature considerably. The heat lost from these films by conduction to other portions of the electrodes is also small due to the thermal insulators 13 and 32. For this reason too, the films 19 and 31 are capable of holding a high temperature without draining a great deal of heat from the plastic sheets. The temperature at the interface 18 of the plastic sheets can, therefore be raised to the welding temperature very quickly, and with little loss of heat to the electrodes.

In practice, it has been found that charring frequently occurs at the perimeter of the electrode due to intense fields created by unavoidable corners or edges at the periphery of the electrodes. These intense fields are smoothed out by the ring 20, which is preferably made of an electrical insulating material having a high dielectric constant. "Isolantite" or glass may be used.

Our calculations indicate that in certain cases in which the film 19 had a thickness of less than 1 mil, this film acquires a temperature rise equal to about three-fourths of the temperature rise needed at the interface 18 to produce the weld. After the generator 10 is shut off, the plasticized material can be cooled in a period of time of the same order as that required for raising the temperature to the welding point. Due to the perfectly fitting die or mold in which the entire welding operation is performed, the welded sheets show no distortion or deformation and the entire welding process can be performed in a very small fraction of a second.

It will be obvious to those skilled in the art that many variations within the scope of our invention can be made. It is obvious that other shapes of electrodes and other materials than those mentioned herein may be used, and that the electrodes may be embodied in various presses and other structures.

We claim:

1. Apparatus for welding a pair of plastic sheets by dielectric heating, comprising a generator of high frequency oscillations, a pair of welding electrodes each having a welding face, means for juxtaposing said welding faces on opposite sides of and in continuous abutment with said plastic sheets, means for applying said high frequency oscillations to said welding electrodes to establish a high frequency electric field therebetween, at least one of said electrode faces comprising a first metallic portion of relatively low thermal storage capacity and a metallic portion of relatively high thermal storage capacity surrounding said first metallic portion.

2. Apparatus for welding thin thermo-plastic sheets by high frequency dielectric heating, which comprises means comprising an electrode for producing high frequency electric field over an area of said sheets to be welded, said electrode having means for relatively slowly abstracting heat from said area during said heating, and said electrode further having means for relatively rapidly abstracting heat from a further area of said sheets immediately surrounding said first mentioned area during said heating.

3. The apparatus defined in claim 2 and further comprising means for firmly pressing said plastic sheets throughout said area to be welded as well as over said area immediately surrounding said first mentioned area during the welding operation.

4. A high frequency dielectric welding system for thin thermo-plastic sheets comprising a high frequency dielectric heating electrode, said high frequency electrode comprising a thin layer of metallic material having a thickness not greater than .01 inch backed by a further layer of heat insulating material, and surrounding said metallic material a mass of metallic material of high heat conduction.

5. A high frequency dielectric welding system for thin thermo-plastic sheets pressed between a pair of dielectric heating electrodes, wherein one of said electrodes comprises a thin metallic layer backed by a further layer of heat insulating material, the other of said electrodes comprising a further thin layer of metallic material backed by a further layer of heat insulating material and a heavy metallic boundary portion surrounding said further layer of heat insulating material and said thin metallic layer of metallic material; and means for applying high frequency voltage between said electrodes.

6. Apparatus for welding thin plastic sheets by means of high frequency electric fields, comprising, electrodes placed on opposite sides of an area portion of a pair of plastic sheets and in pressing contact therewith, means for applying high frequency energy to said electrodes, at least one of said electrodes comprising means for substantially insulating a first portion of said area portion to heat transfer from said sheets to said at least one electrode, and said at least one of said electrodes comprising means for facilitating heat transfer from a further portion of said area portion of said pair of plastic sheets to said at least one electrode, said further portion of said area portion surrounding said first portion of said area.

RAYMOND M. WILMOTTE.
HUGH J. CAMERON.
LARRY L. YOUNG.

REFERENCES CITED

The following references are of record in the file of this patent:

UNITED STATES PATENTS

| Number | Name | Date |
|---|---|---|
| 1,806,846 | Fox | May 26, 1931 |
| 2,222,615 | Hart | Nov. 26, 1940 |
| 2,228,136 | Hart | Jan. 7, 1941 |
| 2,291,807 | Hart | Aug. 4, 1942 |
| 2,322,903 | Wilkoff | June 29, 1943 |
| 2,354,714 | Strickland | Aug. 1, 1944 |
| 2,401,991 | Walton | June 11, 1946 |
| 2,407,833 | Jablonsky | Sept. 17, 1946 |
| 2,423,902 | Peterson | July 15, 1947 |
| 2,442,451 | Albin | June 1, 1948 |
| 2,476,283 | Castellan | July 19, 1949 |

FOREIGN PATENTS

| Number | Country | Date |
|---|---|---|
| 555,645 | Great Britain | Sept. 1, 1943 |
| 573,021 | Great Britain | Nov. 2, 1945 |
| 581,181 | Great Britain | Oct. 3, 1946 |

OTHER REFERENCES

"A Radio Frequency Gun," Electronics, Nov. 1943, pp. 106–111, 310 (pages 106 and 310 relied on).